(12) United States Patent
Chang et al.

(10) Patent No.: US 7,574,131 B2
(45) Date of Patent: Aug. 11, 2009

(54) OBJECT DETECTION SYSTEM AND METHOD

(75) Inventors: Chao-Hung Chang, Taichung (TW); Tain-Tzu Chang, Taichung (TW); Chow-Ing Chang, Taichung (TW)

(73) Assignee: Sunvision Scientific Inc., Taichung (TW)

( * ) Notice: Subject to any disclaimer, the term of this patent is extended or adjusted under 35 U.S.C. 154(b) by 525 days.

(21) Appl. No.: 11/391,553

(22) Filed: Mar. 29, 2006

(65) Prior Publication Data

US 2007/0230943 A1 Oct. 4, 2007

(51) Int. Cl.
*G03B 41/00* (2006.01)
*H04N 7/18* (2006.01)

(52) U.S. Cl. ...................... 396/322; 348/159
(58) Field of Classification Search ............... 396/322, 396/333, 433; 348/143, 144, 149, 150, 153, 348/154, 155, 159
See application file for complete search history.

(56) References Cited

U.S. PATENT DOCUMENTS

| | | | |
|---|---|---|---|
| 6,215,519 B1 * | 4/2001 | Nayar et al. ............ | 348/159 |
| 6,437,819 B1 * | 8/2002 | Loveland ................ | 348/143 |
| 2004/0075738 A1 * | 4/2004 | Burke et al. ............ | 348/143 |
| 2006/0077255 A1 * | 4/2006 | Cheng .................... | 348/143 |

* cited by examiner

*Primary Examiner*—Rodney E Fuller
(74) *Attorney, Agent, or Firm*—Muncy, Geissler, Olds & Lowe, PLLC

(57) ABSTRACT

An object detection system and method is applied to an active surveillance system for detecting at least one target object appeared in an area of interest. The object detection system includes a processor for defining the area of interest into at least a first and a second zone; a controller for assigning a first and a second weight to the first and the second zone, respectively, wherein the first weight is higher than the second weight; and a first image capturing device for capturing an image of the target object appeared in the first zone prior to capturing an image of the target object appeared in the second zone. With these arrangements, the detection of at least one target object appeared in more than one zone having a specific weight assigned thereto may be implemented with improved efficiency and accuracy in object selection and reduced interferences from environmental variables.

4 Claims, 6 Drawing Sheets

OBJECT DETECTION SYSTEM AND METHOD

FIELD OF THE INVENTION

The present invention relates to an object detection system and method for applying to an active surveillance system, so that the detection of at least one target object appeared in more than one zone each having a specific weight assigned in order to improve the efficiency and accuracy of target objects selection and reduced interferences from environmental variables.

BACKGROUND OF THE INVENTION

Most of currently available security surveillance systems have the problems of low image resolution and relatively small target size. The low image resolution results in unclear images that is unidentifiable and could not be effectively improved even through digital image processing. To solve these problems existing in the conventional security surveillance systems, there is development of Automatic Target Tracking System, in which a first image-capturing device is used to get a full-scene image, from which a target object is located through image comparison using a processor; and then, a second image-capturing device is driven to get a local image of target area, so as to effectively obtain the target object image with much improved quality. While the above-described Automatic Target Tracking System effectively improves the image quality, it has many other problems in the practical use. For instance, in the full-scene image, targets such as people, cars, and the like in different zones have different degrees of importance; swaying trees, flags, shadows, etc. form external environmental interferences; and targets are located at different distances from the image-capturing device. In brief, there are complicate background and multiple targets included in the full-scene image at the same time. Moreover, the current image processing technique does not ensure capturing the most important target object.

Another problem with the conventional security surveillance systems is that all the image data stored are full-scene image data, which is very big in volume and adversely shortens the recording time available from one storage device. Currently, a common way to extend the surveillance recording time is to use black-white and/or decrease resolution.

Therefore, it is an important issue to provide a target object detection system and method that is able to effectively locate the target object of interest and determine the degree of importance, and therefore improve the recording quality and efficiency of the surveillance system.

SUMMARY OF THE INVENTION

A primary objective of the present invention is to provide an object detection system and method, which is applied to an active surveillance system to enable detection of at least one target object, appeared in more than one zone, each of which has a specific weight assigned thereto, with improved efficiency and accuracy in target selection and reduced interferences from environmental variables.

Another objective of the present invention is to provide an object detection system and method, which is able to capture and magnify the image of a specified target, so as to present a high-quality clear image.

A further objective of the present invention is to provide an object detection system and method, which is able to process a captured image for a background portion of the image to have a low image resolution and target object portions of the image to have a high image resolution, so that the memory space needed to store the captured image can be reduced.

To achieve the above and other objectives, the object detection system according to the present invention for applying to an active surveillance system to detect at least one target object appeared in an area of interest includes a processor for defining the area of interest into at least a first and a second zone; a controller for assigning a first weight to the first zone and a second weight to the second zone, wherein the first weight is higher than the second weight; and a first image capturing device for capturing an image of a target object appeared in the first zone prior to capturing an image of the target object appeared in the second zone.

With these arrangements, the active surveillance system is able to detect at least one target object in more than one zone, each of which is assigned a specific weight, with improved efficiency and accuracy of target selection and reduced interferences from environmental variables.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

An object detection system and method according to the present invention is used to detect at least one target object appeared in an area of interest. In a first embodiment of the present invention, there is included a processor for defining the area of interest into at least a first and a second zone, and the sizes and locations of the first and the second zone can be changed at a predetermined time cycle; a controller for assigning a first weight to the first zone and a second weight to the second zone, and the first and the second weight can also be changed at a predetermined time cycle, wherein the first weight is higher than the second weight, and values of the first and the second weight can be successively gradually increased in at least one predetermined direction in the area of interest; and a first image capturing device for capturing an image of a target object appeared in the first zone prior to capturing an image of the target object appeared in the second zone. The object detection system may optionally include a second image capturing device for capturing a full-scene image of the area of interest, wherein the first image capturing device has a smaller angle of view than that of the second image capturing device.

Figure 1:
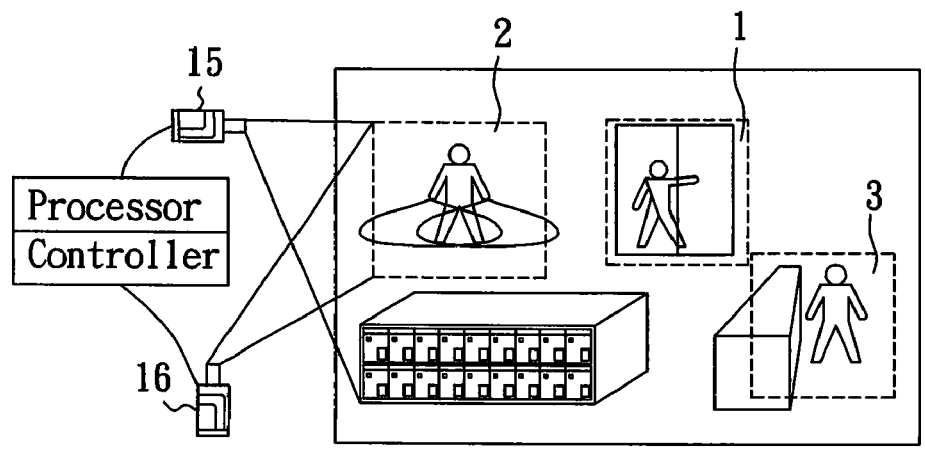
FIG. 1 shows a first example of application of a first embodiment of the present invention.

Please refer to FIG. 1 that shows a first example of application of the object detection system according to the first embodiment of present invention to a surveillance system in a convenient store. In this case, an inner space of the convenient store is divided into a first, a second, and a third zone 1, 2, and 3, corresponding to an entrance area, a merchandise display area, and a check-out stand area, respectively. Any moving objects in the store, for example, are selected as targets to be monitored. And, different weights are assigned to the three zones. More specifically, the first zone 1 is assigned a weight higher than that assigned to the second zone 2, and the second zone 2 is assigned a weight higher than that assigned to the third zone 3. The image capturing device would first capture the target images in the zone having the highest weight. Whereby when there are targets appeared in all the three zones 1, 2, and 3 at the same time, it is ensured images of the targets in the most important zone with the highest weight are always captured at the first priority.

For example, the first image capturing device would, in the first priority, capture the images of persons passing through the first zone 1, that is, the entrance area. When a predetermined time period lapsed and there is no target object appeared in the first zone 1 during this time period, the first image capturing device would then switch to the second zone 2, that is, the merchandise display area, to capture in the first propriety the images of persons appeared in the second zone 2. Similarly, only when there is no target object appeared in the first and the second zone 1, 2 over a predetermined time period, the first image capturing device would switch to the third zone 3 to capture the images of targets appeared therein.

Figure 2:
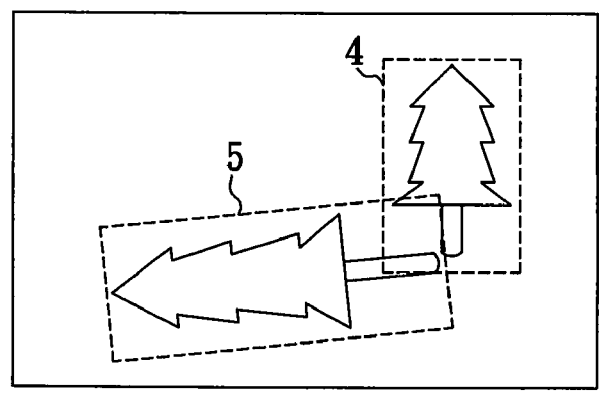
FIGS. 2 and 3 show a second example of application of the first embodiment of the present invention.
Figure 3:
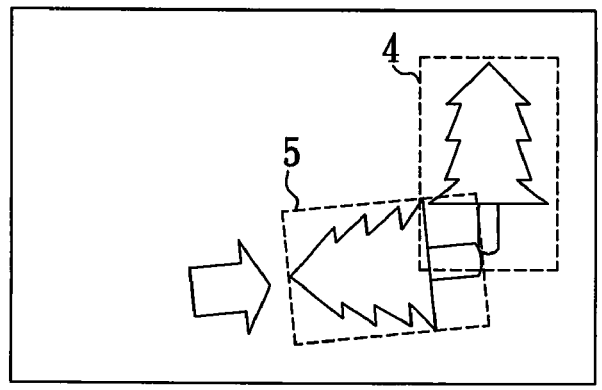

Please refer to FIGS. 2 and 3 that show a second example of application of the object detection system according to the first embodiment of the present invention in tracking outdoor targets. In this case, the target selection by the image capturing device is most frequently affected by trees swaying in the wind and tree shadows that change in length and location with the moving sun. To avoid these unfavorable factors, the object detection system of the present invention is able to assign a lower or zero weight to the areas with fixed trees 4 and the areas with time-changing shadows 5 to minimize the interferences from external environment to improve the accuracy and efficiency of target selection.

Figure 4:
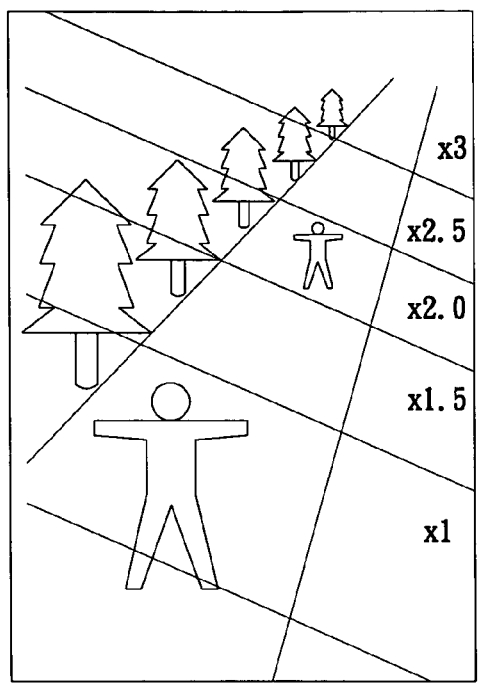
FIGS. 4 and 5 show a third example of application of the first embodiment of the present invention.
Figure 5:
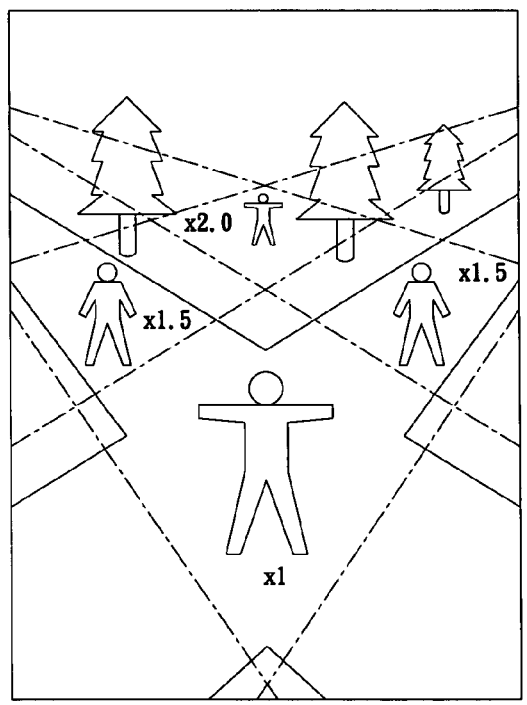

FIGS. 4 and 5 show a third example of application of the object detection system according to the first embodiment of the present invention in tracking targets at different distances. In this case, the object detection system uses the first image capturing device, which has a relatively small angle of view, to capture the high resolution images of targets; and the second image capturing device, which has a relatively large angle of view, to capture a full-scene image of the area of interest.

In the process of analyzing the full-scene image of the area of interest using the second image capturing device, the area of interest is divided into several zones, each of which has a specific weight assigned thereto depending on the distance and orientation thereof to avoid a distant target from being ignored due to its small image size. That is, the probability of selecting a near and a distant target is the same. Considering that the targets of the same physical size at different distances would produce images of different sizes, the object detection system of the present invention would adjust the weight gradient to ensure that targets located in different zones are equally selected.

Figure 6:
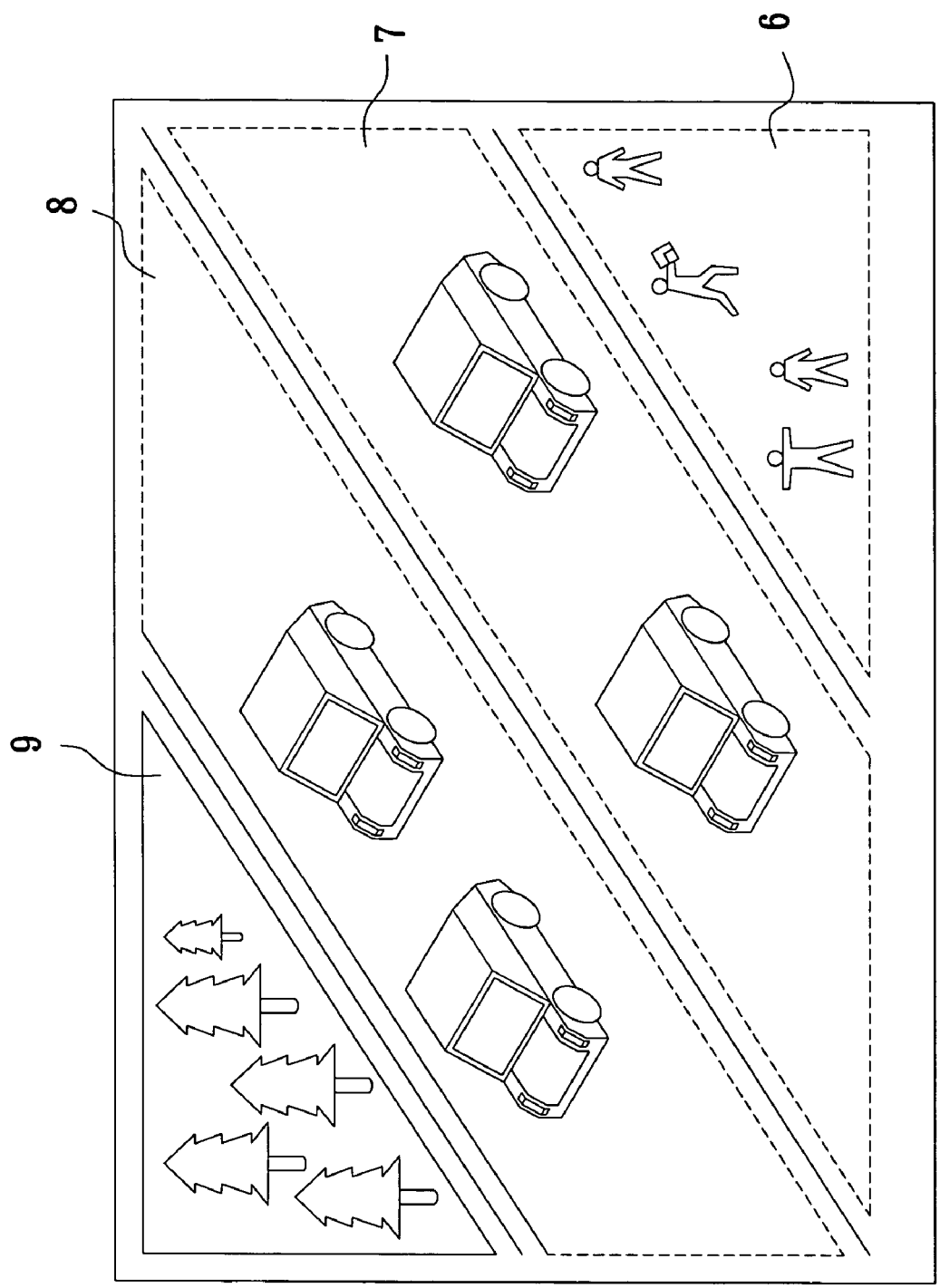
FIG. 6 shows a fourth example of application of the first embodiment of the present invention.

FIG. 6 shows a fourth example of application of the object detection system according to the first embodiment of the present invention in traffic surveillance. In this case, the area to be monitored is divided into several zones, such as first, second, third, and fourth zone 6, 7, 8, and 9, corresponding to an open place for the public, two traffic lanes, and a park area, respectively. Here, the second and the third zone 7 and 8, that is, the two traffic lanes, are assigned a weight higher than that assigned to the first zone 6 (i.e. the open place for the public), and the fourth zone 9, that is, the park area, is assigned the lowest weight. With different weights assigned to different zones, target appeared in the zone with the highest weight is selected in the first priority.

The object detection system according to a second embodiment of the present invention can be applied to a surveillance system to improve the image data storage efficiency of the surveillance system. In this case, the surveillance system includes an image capturing device for capturing a first full-scene image of a predetermined area, and the first full-scene image having a first image resolution; and a first data storing unit for receiving data of the first full-scene image captured by the image capturing device, so that the first full-scene image data can be stored and then transferred to a data identifying unit connected to the first data storing unit.

The data identifying unit receives the first full-scene image data transferred from the first data storing unit, and identifies the image of at least one target object appeared in the first full-scene image, and divides the first full-scene image data into target image data and background image data. The data identifying unit includes the object detection system according to the second embodiment of the present invention for detecting data of at least one target object appeared in the full-scene image data. The object detection system includes a processor for defining the full-scene image into at least a first and a second zone; a controller for assigning a first weight to the first zone and a second weight to the second zone, wherein the first weight is higher than the second weight; an image capturing device for capturing an image of a target object appeared in the first zone prior to capturing an image of the target object appeared in the second zone; a data converting unit for receiving the background image from the data identifying unit and converting the received background image having the first image resolution to an image having a second image resolution, wherein the second image resolution is lower than the first image resolution; and an image synthesizer for receiving the background image having the second image resolution and the target image having the first image resolution to synthesize a second full-scene image, which includes the background image having the second image resolution and the target image having the first image resolution.

Figure 7:
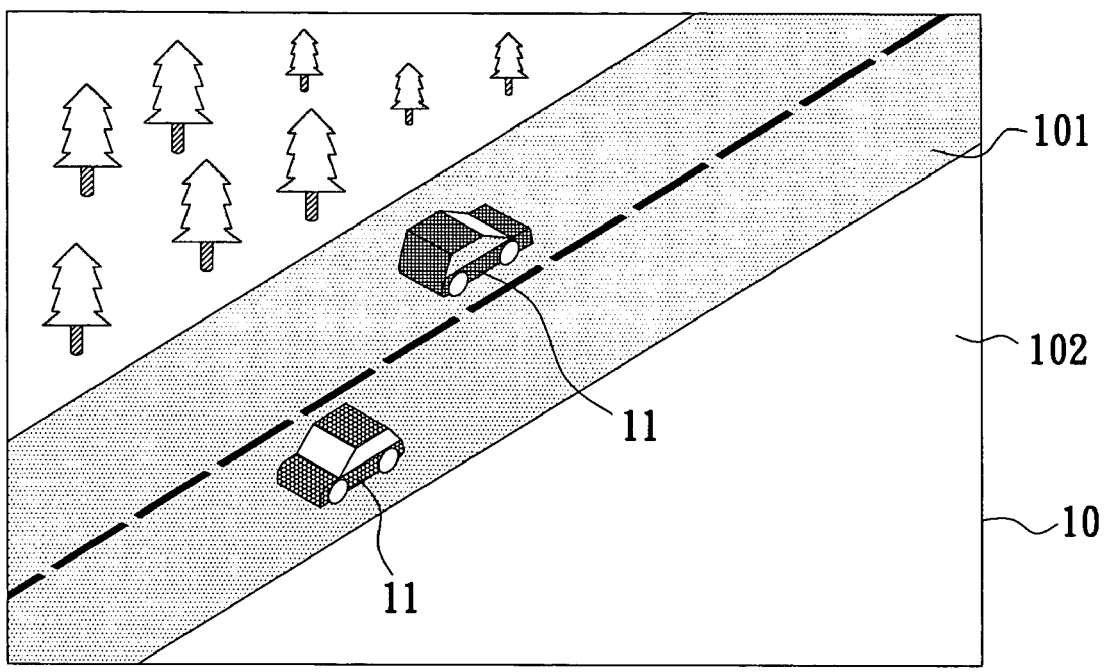
FIGS. 7 and 8 show an example of application of a second embodiment of the present invention.
Figure 8:
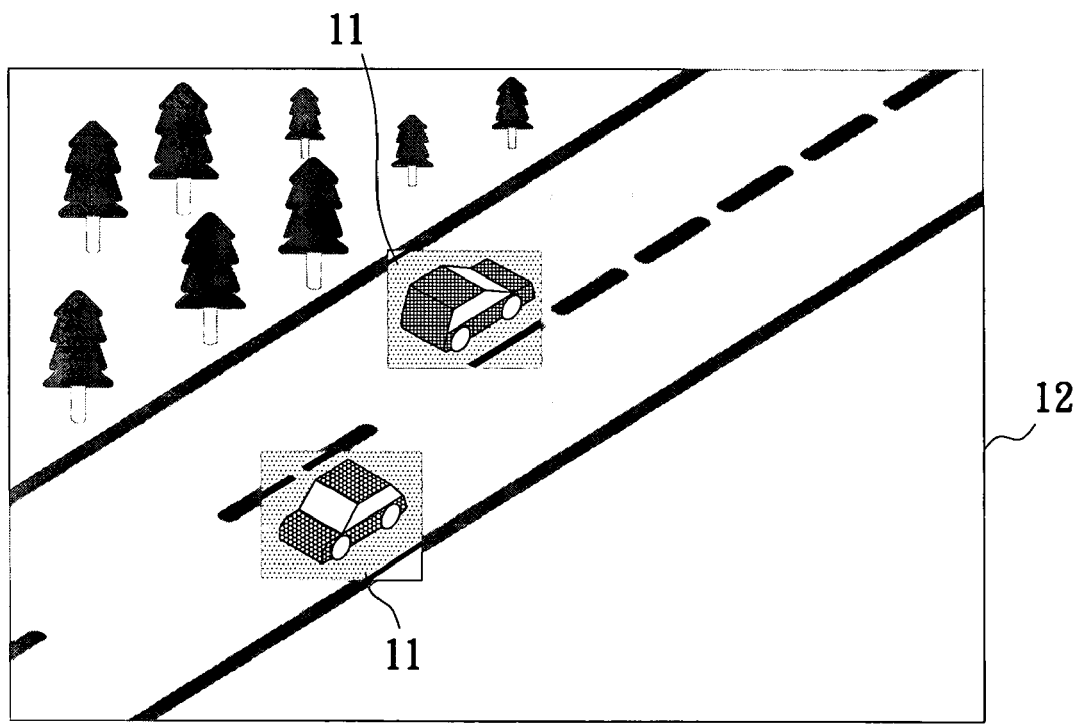

Please refer to FIGS. 7 and 8, which show a method of monitoring vehicles appeared on a road using the above-described surveillance system employing the object detection system according to the second embodiment of the present invention. The method includes the following steps:

(1) Use an image capturing device to capture a first full-scene image 10 of a predetermined area to be monitored, and the first full-scene image 10 having a first image resolution;

(2) Store the first full-scene image 10 in a first data storing unit, and transfer the data of the first full-scene image 10 from the first data storing unit to a data identifying unit; and (3) Identify from the first full-scene image 10 an image of at least one target object 11 of interest (i.e. a vehicle), and divide the first full-scene image 10 into a target image and a background image using the data identifying unit.

Wherein the data identifying unit includes the object detection system according to the second embodiment of the present invention, which detects at least one target object 11, appeared in the first full-scene image 10 via the following steps:

(a) Define the first full-scene image 10 into at least a first zone 101 and a second zone 102;
(b) Assign a first weight to the first zone 101, and a second weight to the second zone 102; wherein the first weight is higher than the second weight;
(c) Use an image capturing device to capture an image of the target object 11 appeared in the first zone 101 prior to capturing an image of the target object appeared in the second zone 102;
(d) Use a data converting unit to receive the background image from the data identifying unit, and convert the received background image having the first image resolution to an image having a second image resolution, wherein the second image resolution is lower than the first image resolution; and
(e) Use an image synthesizer to receive the background image having the second image resolution and the target image having the first image resolution to synthesize a second full-scene image 12, which includes the background image having the second image resolution and the target image having the first image resolution.

In brief, a full-scene image 10 having the target object 11 appeared therein is captured using a high-resolution image capturing device, and then, the captured full-scene image 10 is subjected to image processing to keep the image of the target object 11 in the high-resolution while the image other than the target object 11 is treated as background, which is processed to have a lower image resolution in order to lower the burden of transmission and storage of image data and reduce the memory space occupied by the image data, enabling the memory to store only the more useful image data.

An object detection system according to a third embodiment of the present invention may be applied to a surveillance system, which includes an image capturing device for capturing a full-scene image of a predetermined area to be monitored; and a first data storing unit for receiving data of the full-scene image captured by the image capturing device, so that the full-scene image data can be stored and then transferred to a data identifying unit connected to the first data storing unit.

The data identifying unit receives the full-scene image data transferred from the first data storing unit, and identifies the image of at least one target object appeared in the full-scene image, and divides the full-scene image into target image and background image. The data identifying unit includes the object detection system according to the third embodiment of the present invention for detecting at least one target object appeared in the full-scene image. The object detection system includes a processor for defining the full-scene image into at least a first and a second zone; a controller for assigning a first weight to the first zone and a second weight to the second zone, wherein the first weight is higher than the second weight; an image capturing device for capturing an image of a target object appeared in the first zone prior to capturing an image of the target object appeared in the second zone; and a second data storing unit for receiving data of the target image, and data of the background image previously stored on the first data storing unit is deleted from the first data storing unit when the data of the target image has been stored on the second data storing unit.

Figure 9:
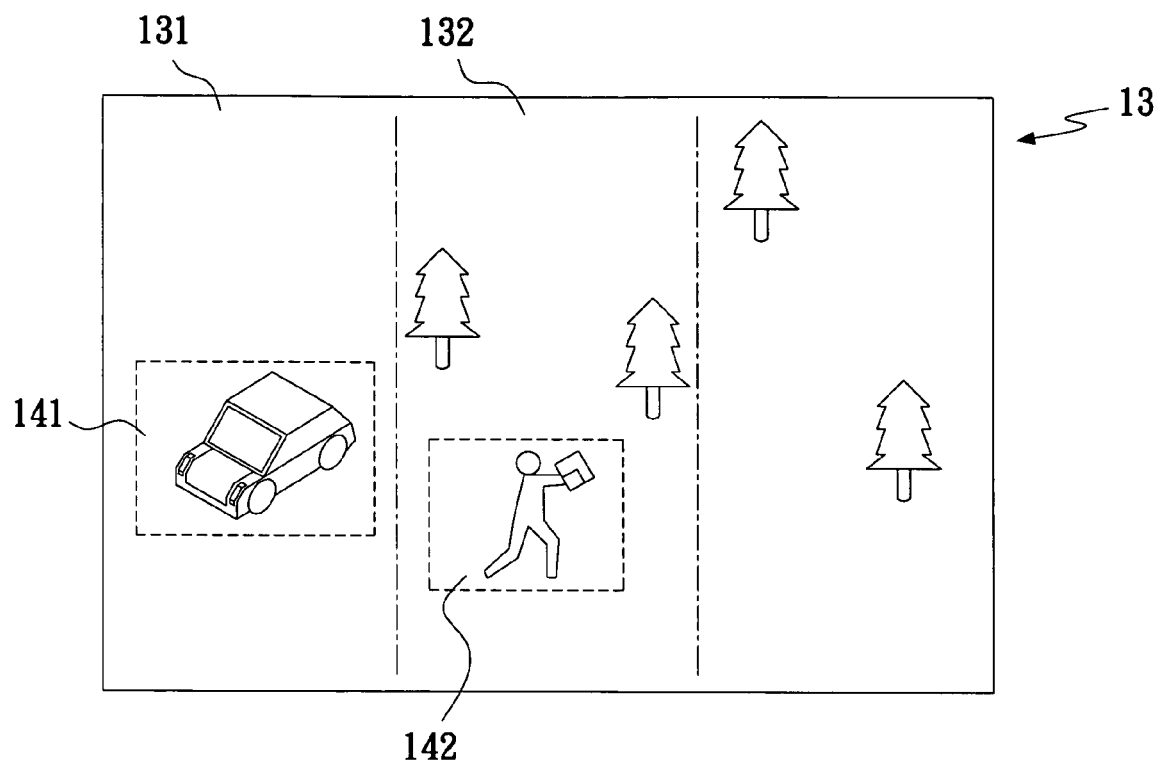
FIGS. 9 and 10 show an example of application of a third embodiment of the present invention.
Figure 10:
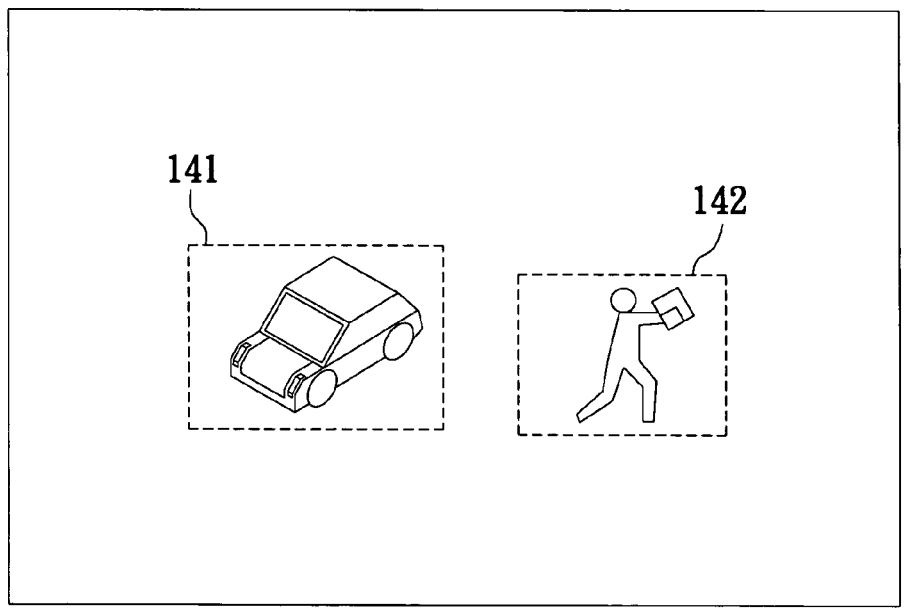

Please refer to FIGS. 9 and 10 which show a method of surveillance of at least one target object appeared in a predetermined area using the above-described surveillance system employing the object detection system according to the third embodiment of the present invention. The method includes the following steps:

(1) Use an image capturing device to capture a full-scene image 13 of a predetermined area to be monitored;
(2) Store data of the captured full-scene image 13 on a first data storing unit;
(3) Transfer the data of the full-scene image 13 from the first data storing unit to a data identifying unit, which is connected to the image capturing device; and
(4) Use the data identifying unit to identify the image of at least one target object 141, 142, which is a vehicle or a person in this case, appeared in the full-scene image 13, and divide the full-scene image 13 into image of the target object 141, 142 and background image; wherein the data identifying unit includes the object detection system according to the third embodiment of the present invention, which detects at least one target object 141 appeared in the full-scene image 13 via the following steps:

(a) Define the full-scene image 13 into at least a first zone 131 and a second zone 132;
(b) Assign a first weight to the first zone 131, and a second weight to the second zone 132; wherein the first weight is higher than the second weight;
(c) Use an image capturing device to capture an image of the target object 141 appeared in the first zone 131 prior to capturing an image of the target object 142 appeared in the second zone 132;
(d) Transfer the image data of the target object 141 to a second data storing unit; and
(e) Delete the background image data from the first data storing unit when the image data of the target object 141 has been transferred to the second data storing unit.

In a next cycle of surveillance, the image of the target object 142 is captured.

Since only the images of the target objects 141, 142 are stored in the memory while the background image data is completely deleted, the memory space occupied by the captured image is greatly reduced. In brief, a full-scene image 13 having the target object appeared therein is captured using an image capturing device, and then, the captured full-scene image 13 is subjected to image processing to keep the images of the target objects 141, 142 while the image other than the target objects 141, 142 are treated as background, which is completely deleted in order to lower the burden of transmission and storage of image data and reduce the memory space occupied by the image data, enabling the memory to store only the more useful image data.

Figure 11:
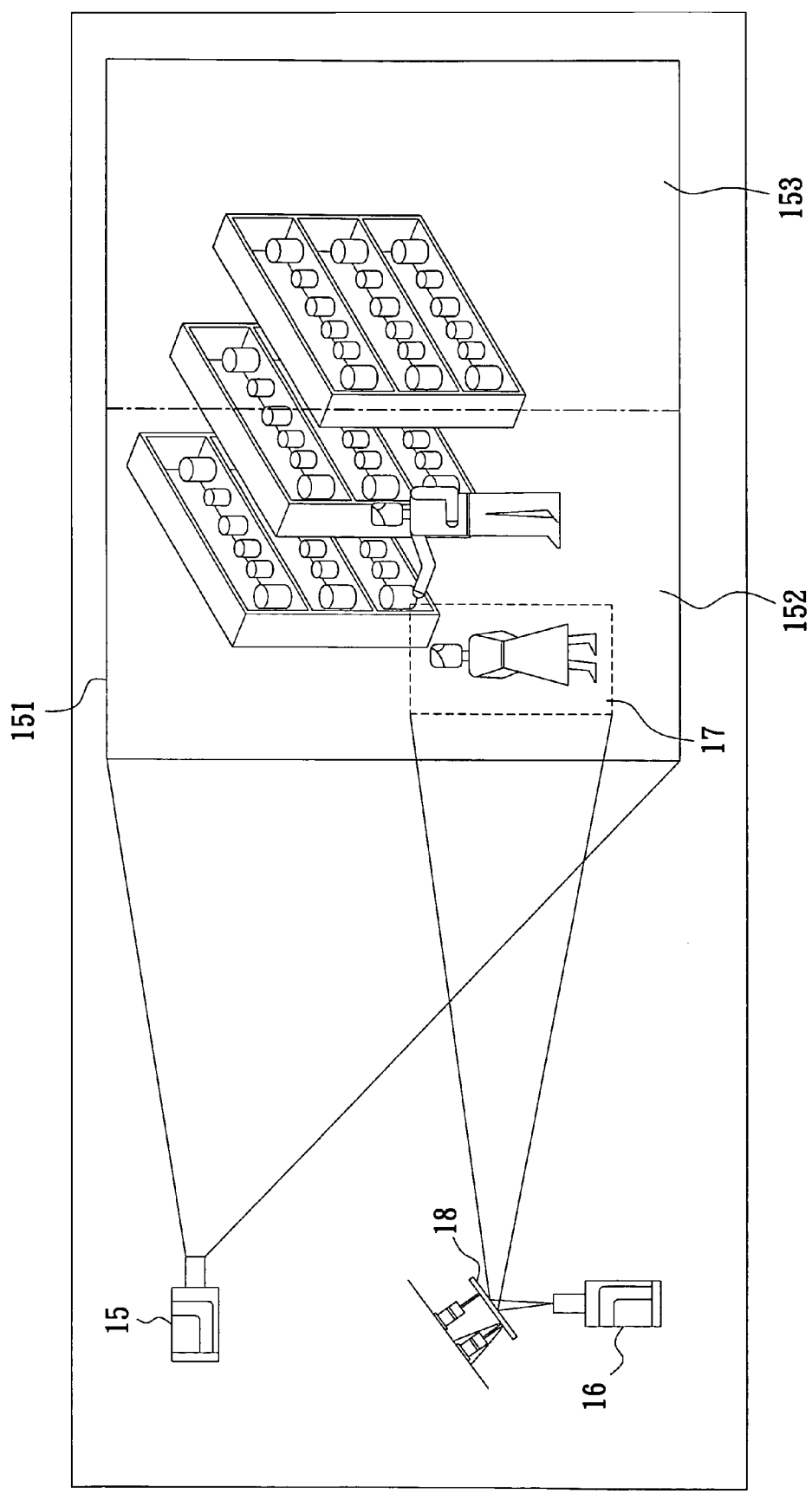
FIG. 11 shows an example of application of a fourth embodiment of the present invention.

Please refer to FIG. 11 which shows an example of applying an object detection system according to a fourth embodiment of the present invention to still another surveillance system. In this case, the surveillance system includes a first image capturing device 15 having a first angle of view for capturing a full-scene image 151 of a predetermined area to be monitored; a second image capturing device 16 having a second angle of view smaller than the first angle of view and a second image resolution for tracking and capturing an image of at least one target object 17 appeared in the predetermined area to be monitored, wherein the second image capturing device may be movable, or immovable but with a moveable mirror in front of it; and an object detection system according to a fourth embodiment of the present invention for controlling the second image capturing device 16 in tracking the target.

The object detection system includes a processor for receiving data of the full-scene image 151 from the first image capturing device 15, and defining the full-scene image 151 into at least a first zone 152 and a second zone 153; a controller for assigning a first weight to the first zone 152 and a second weight to the second zone 153, wherein the first weight is higher than the second weight; and a target locating device for locating a target object 17 appeared in the first zone 152 prior to locating a target appeared in the second zone 153. When the second image capturing device 16 is movable, it follows the location of the target object 17 provided by the object detection system to track the target object 17; and when the second image capturing device 16 is immovable, a movable mirror is further provided to reflect an image of the target object 17 to the second image capturing device 16 to achieve the purpose of tracking the target object 17. In brief, in this application example, the first image capturing device 15 captures a full-scene image 151, the object detection system locates the position of the target object 17, and then the second image capturing device 16 is driven to lock on the target object 17 and capture the target image with high resolution.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An object detection system for detecting at least one target object present in an area of interest, the system comprising:
    a processor for defining the area of interest into at least a first region and a second region;
    a controller for assigning a first priority to the first region and assigning a second priority to the second region, wherein the first priority is higher than the second priority;
    a first image capturing device for capturing image of the target object present in the first region prior to capturing image of the target object present in the second region;
    a second image capturing device for capturing a panoramic image of the area of interest, wherein the first image capturing device has a smaller angle of view than the second image capturing device; and
    wherein the controller lowers the first priority or the second priority after the first image capturing device captured the target object present in the first region or the second region over a predetermined time.

2. The object detection system as claimed in claim 1, wherein values of the first priority and the second priority are successively increased in at least one predetermined direction.

3. An object detecting method for detecting at least one target object present in an area of interest, the method comprising the steps of:
    defining the area of interest into at least a first region and a second region;
    assigning a first priority to the first region and a second priority to the second region, wherein the first priority is higher than the second priority;
    capturing an image of the target object in the first region prior to capturing an image of the target object in the second region with a first image capturing device;
    capturing a panoramic image of the area of interest with a second image capturing device, wherein the first image capturing device has a smaller angle of view than the second image capturing device; and
    lowering the first priority or the second priority after the first image capturing device-captured the target object present in the first region or the second region over a predetermined time.

4. The object detection method as claimed in claim 3, wherein values of the first priority and the second priority are successively increased in at least one predetermined direction.

* * * * *